Figure 1:
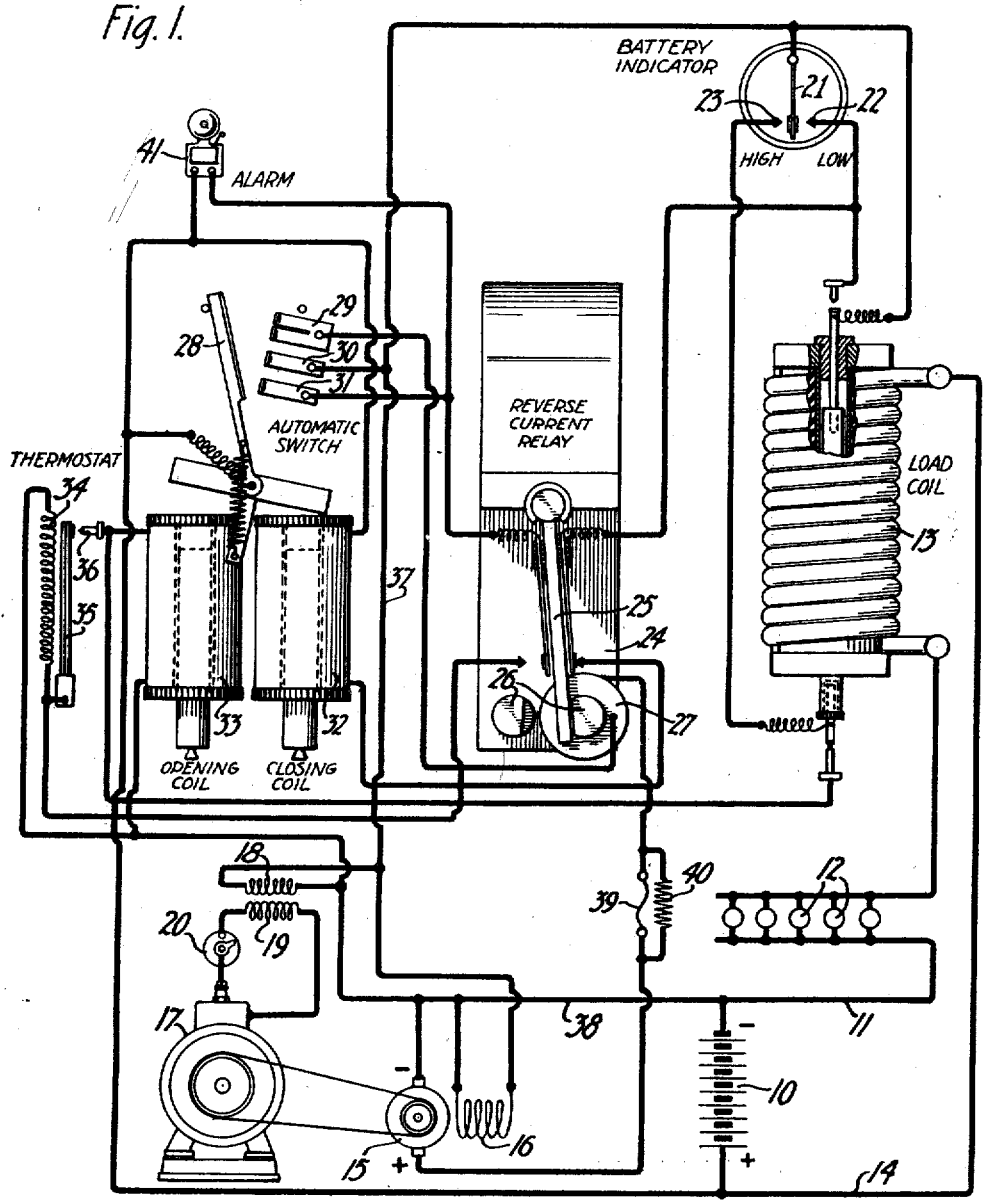

Nov. 27, 1923.

B. E. GETCHELL

ELECTRIC SYSTEM

Filed July 22, 1922

1,475,295

3 Sheets-Sheet 2

Inventor:
Benjamin E. Getchell
by his Attorney

Nov. 27, 1923.

B. E. GETCHELL

ELECTRIC SYSTEM

Filed July 22, 1922

1,475,295

3 Sheets-Sheet 3

Inventor:
Benjamin E. Getchell
by his Attorney

Patented Nov. 27, 1923.

1,475,295

UNITED STATES PATENT OFFICE.

BENJAMIN E. GETCHELL, OF PLAINVILLE, CONNECTICUT, ASSIGNOR TO THE TRUMBULL ELECTRIC MANUFACTURING COMPANY, OF PLAINVILLE, CONNECTICUT, A CORPORATION OF CONNECTICUT.

ELECTRIC SYSTEM.

Application filed July 22, 1922. Serial No. 576,705.

*To all whom it may concern:*

Be it known that I, BENJAMIN E. GETCHELL, a citizen of the United States of America, residing at Plainville, county of Hartford, State of Connecticut, have invented new and useful Improvements in Electric Systems, of which the following is a specification.

This invention relates to electric systems and more particularly to systems for automatically controlling the operation of small electric power plants useful for example in farm lighting.

Such power plants usually comprise a storage battery, a prime mover such as an internal combustion engine, and a dynamo electric machine to operate both as a motor to start the prime mover and as a generator to charge the storage battery or supplement it in carrying overloads on the work circuit. An important object of this invention is to provide simple, reliable controlling means for these units, such that the generator will be set in operation whenever the battery is in need of charging or the work circuit demands a heavier current than the battery is designed to supply, and further arranged to continue the operation of the generator when once started, until the battery is fully charged and the load has become normal.

When either condition arises requiring operation of the dynamo as a generator, the storage battery is automatically connected to the dynamo, the resulting current flow tending to operate the latter as a motor to start the engine. If the apparatus functions normally the engine starts and thereafter drives the dynamo as a generator to supply current to the storage battery and the work circuit, thereby reversing the direction of flow of current in the armature circuit. If the engine fails to start, or when running, ceases to operate through accident, lack of fuel or the like, the battery is subjected to a useless load and should be disconnected from the dynamo.

It is a further object of this invention to provide a time element device to control the disconnection of the battery and dynamo and means responsive to the flow of current in a direction tending to operate the dynamo as a motor for actuating the time element device.

A further object of the invention is to provide an alarm operated whenever the plant is shut down due to the occurrence of such an unstandard condition. Still another object is to arrange the controlling circuits so that the battery cannot again be connected to the dynamo until an operator has manually closed a circuit which was open at the time of the shutdown.

One embodiment of the invention for carrying out the foregoing and other objects is illustrated in the accompanying drawings, in which:

Fig. 1 is a diagram of the electric system and its controlling circuits, certain apparatus being shown in front elevation, and, Figs. 2, 3, 4, 5, 6, 7, 8 and 9 are diagrams of the various circuits completed during the operation of the system.

Referring to Fig. 1, 10 represents a storage battery connected to a work circuit which may be traced from the negative pole of battery, wire 11, through the load here indicated as a number of parallel connected lamps 12, the winding 13 of a load coil and wire 14 to the positive pole of battery. Obviously the load may consist of apparatus other than lamps, and there may be individual switches not shown to control the operation of the various elements constituting the load. The load coil may be of any structure which includes a contact closed except when the load current exceeds a predetermined amount and a second contact closed only when such current exceeds such amount.

A dynamo electric machine having an armature 15 and field 16 is operatively connected as by a belt to a prime mover of any suitable type, here shown as an internal combustion engine 17. A coil comprising a primary winding 18 and a secondary circuit including a winding 19 and an interrupter 20 supplies ignition to the engine when the winding 18 is energized.

In the controlling circuits of the system there are employed, in addition to the foregoing, a battery indicator, a reverse current relay, an automatic electromagnetically actuated switch, a time element device and an alarm. The battery indicator may be either an ampere-hour meter, a voltmeter, or a hydrometer device responsive to the condition of the electrolyte, but whichever type indicator is employed it comprises a movable contact 21 arranged to close a circuit through a contact 22 when the battery is in need of charging, and through a contact 23 when the battery is fully charged.

The reverse current relay may be of any type which will close one set of contacts upon current flow in one direction and will close another set of contacts and open the first set upon a reversal of the direction of current, the position of the contacts remaining unchanged upon discontinuance of the current. But perferably the reverse current relay consists of a permanent magnet 24, one end of which pivotally supports a polarized armature 25 carrying two contacts insulated from one another, and from the other end of which permanent magnet there project two soft iron cores 26, the right hand core carrying a winding 27 so wound that current flowing therethrough in one direction closes the right hand contacts of the relay, while current in a reverse direction closes the left hand contacts.

The automatic switch comprises a movable terminal 28 which engages three fixed terminals 29, 30 and 31 upon energization of a closing coil 32, while energization of an opening coil 33 disengages the movable and fixed terminals, a center spring being provided as shown to hold the switch open or closed according to which coil was last energized.

Audible or visible trouble signals may be given by any suitable alarm such as a bell, annunciator or lamp, there being here shown a bell 41 for this purpose.

The time element device is actuated whenever current flows through the dynamo in a direction which tends to operate the same as a motor, and is arranged upon the continuance of such flow for too long an interval to shut down the system and operate the alarm. To accomplish this result the time element device may consist of any apparatus which responds to the quantity of electricity or power flowing through a circuit, such as an ampere-hour or watt-hour meter, but in its simplest form the device, as shown in the drawings, consists of a heating coil 34 to expand a thermostatic element 35 which will contact with an adjustable contact 36 to close an auxiliary circuit when a predetermined amount of power has passed through the heating coil 34.

Figure 2:
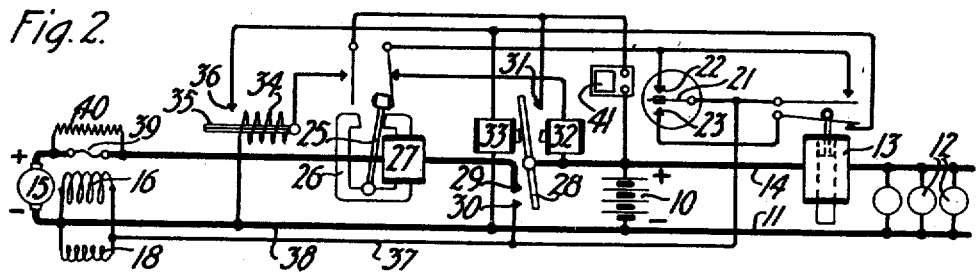
Figure 3:
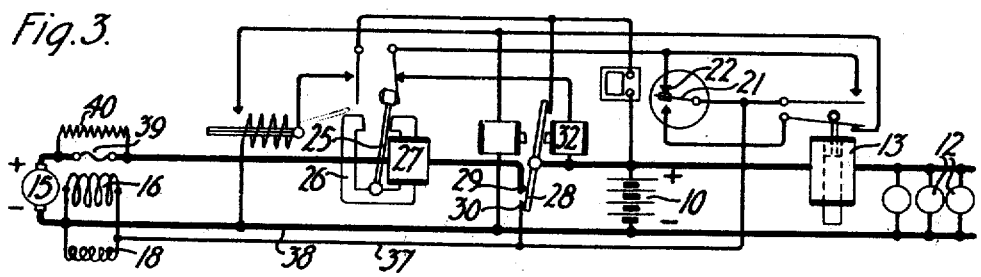

When no more than the normal load on the battery is demanded by the work circuit and the battery is sufficiently charged, the circuits of the system will be as shown in Figs. 1 and 2, all the circuits being open except the work circuit which is always closed. When the battery has become sufficiently discharged to require charging, the movable contact 21 of the battery indicator will abut low voltage contact 22, thereby completing a circuit which may be traced from the positive pole of battery, closing coil 32 of the automatic switch, right hand contacts of reverse current relay 26, contacts 22 and 21 of the battery indicator, wire 37, field winding 16 and primary winding 18 of the ignition coil in parallel, and wire 38 to the negative pole of battery. The current flowing in this circuit energizes coil 32 to close the switch 28, and partially energizes the windings 16 and 18 to prepare the dynamo for operation as a motor and supply ignition to the engine, and the system is as shown in Fig. 3.

Figure 4:
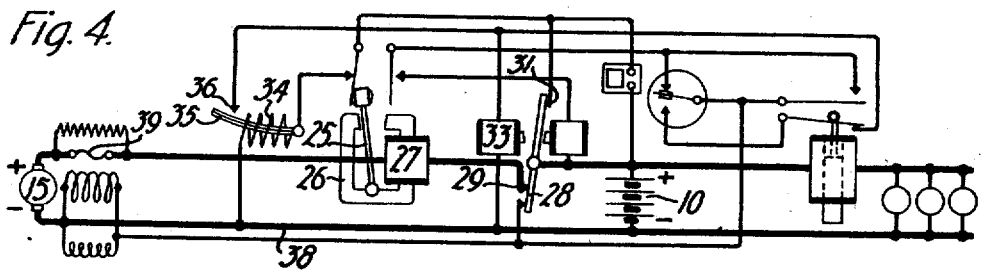

Switch terminal 28 in closing against terminal 30 shunts closing coil 32 and the battery indicator contacts 21, 22 out of the circuit just traced, full energizing current for windings 16 and 18 being supplied from the positive pole of battery, terminals 28 and 30, wire 37, windings 16 and 18 in parallel, and wire 38 to the negative pole of battery. In closing against terminal 29 switch 28 completed the armature circuit for the dynamo which is traceable from the positive pole of battery, switch terminals 28 and 29, winding 27 of the reverse current relay, fuse 39 and resistance 40 in parallel, through the armature 15 and wire 38 to the negative pole of battery. Current flows in this circuit in a direction which energizes winding 27 to throw the armature 25 of the reverse current relay to the left, closing the left hand and opening the right hand contacts of said relay, but there is no arcing at the latter contacts as no current was flowing through them. The system is now as shown in Fig. 4.

Figure 5:
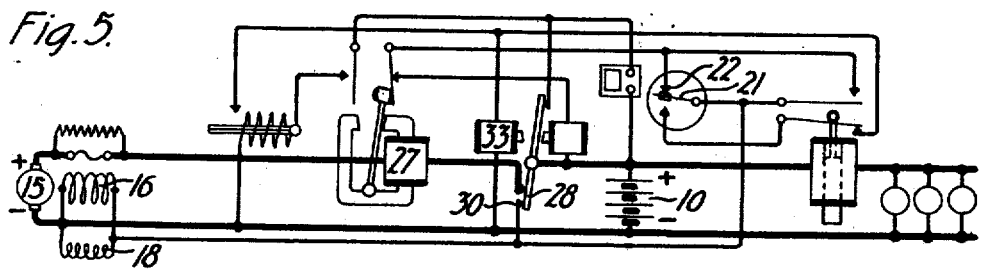

The completion of the field and armature circuits just traced operates the dynamo as a motor to start the engine 17. So long as current flows through the armature circuit in the direction tending to operate the dynamo as a motor, the left hand contacts of the reverse current relay are closed to actuate the time element device over a circuit which may be traced from the positive pole of battery, terminals 28 and 31, left hand contacts of relay 26, through the heating coil 34 and wire 38 to the negative pole of battery. The heat developed by the heating coil warps thermostat 35 towards contact 36, but this contact is so adjusted that contact 35 will not warp far enough to touch it during the time normally required to start the engine. When the engine begins to operate under its own power it drives the dynamo as a generator. The generator potential being higher than that of the discharged battery, current flows from the positive brush of the armature through the fuse 39, winding 27, and terminals 29 and 28 to the positive pole of storage battery 10, and through the storage battery to the negative brush of the armature over wire 38, thus charging the battery. The direction of current passing through winding 27 being thus reversed, armature 25 of the reverse current relay is moved to the right to interrupt the heating coil circuit previously traced, and the system is as shown in Fig. 5.

Figure 6:
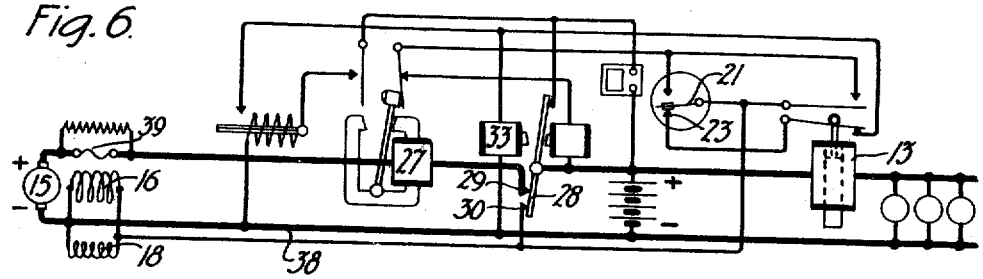
Figure 7:
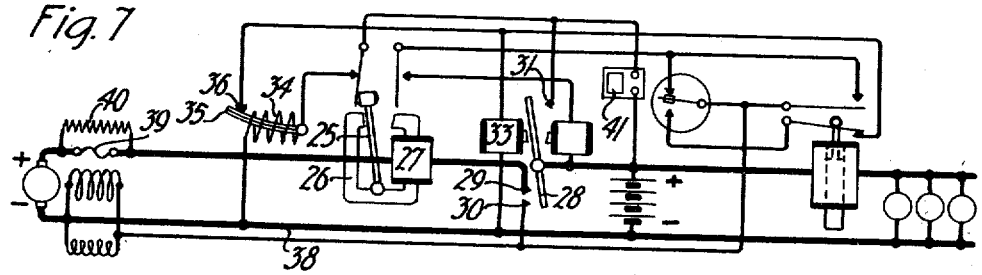

While the dynamo is operating as a generator it not only charges the battery but supplies all normal demands of the work circuit. If the demand increases sufficiently the generator still supplies it but ceases to charge the battery which merely floats across the armature circuit, while if the demand increases beyond this point, current is drawn from the battery as well as the generator. When the generator has commenced to charge the storage battery, the movable contact 21 of the battery indicator moves out of engagement with low voltage or low charge contact 22, but there is no arcing between these contacts as they are shunted by terminals 28 and 30 in the manner previously described. When the system functions normally, the generator continues to charge the storage battery until movable contact 21 engages high voltage or full charge contact 23, indicating that the battery is fully charged, at which time the system is as shown in Fig. 6.

If at this time the work circuit is not demanding more current than the battery is designed to supply, the lower contacts of the load coil 13 will be closed, and the closure of the high voltage or full charge contacts of the battery indicator will complete a circuit from the positive brush of armature 15, fuse 39, winding 27, terminals 29, 28 and 30, indicator contacts 21, 23, lower contacts of load coil 13, through opening coil 33 and wire 38 to the negative brush of the armature. The opening coil 33 is energized in this circuit to open the automatic switch, the disengagement of terminal 28 from terminal 29 interrupting the circuit previously traced through the primary winding 18 of the ignition coil and thus stopping the engine 17. The armature and field circuits previously traced are also interrupted at terminals 29 and 30, as is the circuit for opening coil 33 through the battery indicator contacts. Thus all the auxiliary controlling circuits are opened, and as soon as a slight discharge of the battery has moved indicator contact 21 out of engagement with contact 23 the system will be in its normal position as shown in Figs. 1 and 2. There will be no arcing between contacts 21 and 23 since no current is flowing through them at the time of their opening. If at the time contact 21 engages contact 23 upon the full charging of the battery, the work circuit is demanding more current than the battery is designed to supply, the armature of the load coil 13 will be attracted sufficiently to open the lower contacts of the load coil, so that the circuit previously traced for opening coil 33 will be interrupted at said lower contacts, and the generator will continue in operation until a return to normal load closes the lower contacts of the load coil to complete the opening coil circuit.

It will be remembered that during the operation of the dynamo as a motor to start the engine, with the circuits as shown in Fig. 4, an actuating circuit for the time element device is completed from the positive pole of battery, terminals 28 and 31, left hand contacts of relay 26 through the heating coil 34 and wire 38 to the negative pole of battery. The heat developed in coil 34 tends to warp thermostat arm 35 towards contact 36, but under normal conditions the engine starts before the thermostat arm engages adjustable contact 36, and the actuating circuit is interrupted by the opening of the left hand contacts of relay 26. If, however, the engine for any reason fails to start within a reasonable time, the continued heat of the coil 34 moves thermostat arm 35 into engagement with contact 36, thereby completing a circuit in parallel with the actuating circuit from the positive pole of battery, terminals 28 and 31, left hand contacts of relay 26, arm 35, contact 36, through opening coil 33 and wire 38 to the negative pole of battery. Opening coil 33 is energized in this circuit to open the automatic switch, and the system is in the position shown in Fig. 7.

Terminal 28 in disengaging from terminals 29 and 30 interrupts the dynamo and ignition circuits previously traced, while in disengaging from terminal 31 it removes a shunt circuit which previously prevented operation of the alarm here shown as a bell 41. The alarm now operates over a circuit traceable from the positive pole of battery, bell 41, left hand contacts of relay 26, heating coil 34, and wire 38 to the negative pole of battery. The sound of the alarm gives notice that the plant is shut down and in need of attention before it can again operate. The inclusion of the bell in the heating coil circuit so increases the resistance of this circuit that the decreased flow of current will not produce sufficient heat to maintain thermostat arm 35 in engagement with contact 36, thereby interrupting the circuit for opening coil 33, so that the only drain on the battery is the current required to ring the bell 41. The time during which the dynamo is permitted to run as a motor without automatically shutting down the system may be regulated by adjustment of contact 36 towards or away from thermostat arm 35. When the system has been thus shut down, it cannot again be started automatically until the armature 25 of the reverse current relay 26 has been manually moved to its right hand position, since the circuit for the closing coil 32 of the automatic switch is interrupted as long as the right hand contacts of the reverse current relay are open.

After the dynamo has started the engine, and while the latter runs the dynamo as a generator, with circuits completed as shown in Fig. 5, in case the engine slows down on account of mechanical or electrical trouble, overloading, failure of the fuel supply or for any other reason, the generator potential will fall below that of the battery, and the direction of current in the armature circuit is therefore reversed, the battery tending to operate the dynamo as a motor to again start the engine. The reversed current flowing in the armature circuit through winding 27 of the reverse current relay moves armature 25 to the left and thereby completes the previously traced circuit (shown in Fig. 4) for the heating coil. If the engine fails to resume speed during the time required for arm 35 to engage contact 36 the closure of said contacts energizes opening coil 33 over the circuit previously traced (shown in Fig. 4) and the system is in the position shown in Fig. 7. The power plant is disconnected from the battery and the alarm circuit completed in the manner previously described. If the engine or generator stops due to a locked bearing or other mechanical trouble, the current flowing through the armature circuit rises high enough to blow fuse 39, thereby protecting the armature from being burned out. The resistance 40 permits sufficient current to flow through the armature circuit to operate the reverse current relay. Whether the fuse 39 blows or not, the current in the armature circuit passing through winding 27 of the reverse current relay moves armature 25 to the left and thereby completes the previously traced circuit (shown in Fig. 4) for the heating coil. After the predetermined time interval for operation of the thermostat arm the power plant is disconnected and the alarm operated in the manner just described. Thus in case the dynamo operates as a motor or ceases to operate, the power plant is disconnected and an alarm given.

If, however, the engine slows down enough to drop the generator voltage below that of the batteries but is able to resume normal speed before thermostat arm 35 engages contact 36, then the potential of the generator is higher than that of the battery. The current in the armature circuit is reversed a second time and interrupts the circuit of the time element device in the same manner as upon the original starting of the engine. Thus the normal operation is resumed and the generator continues to charge the battery and supply current to the line until the battery is fully charged, and the demand of the work circuit has become normal.

Figure 8:
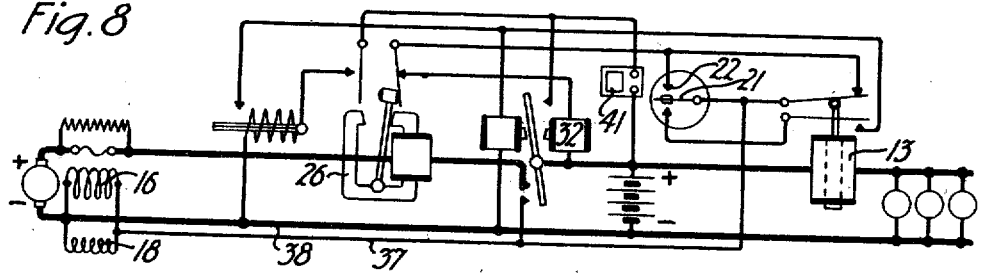
Figure 9:
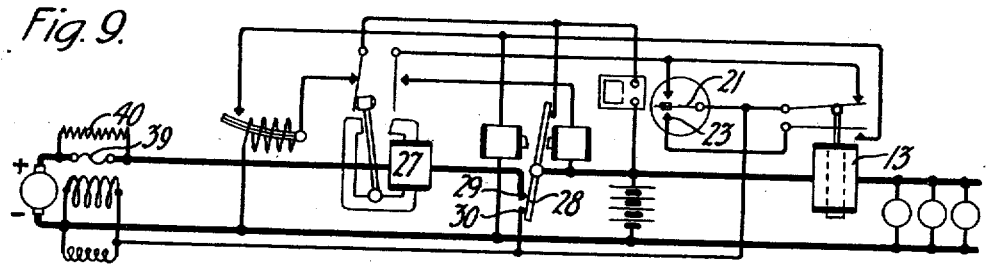

While the system is in normal position with the engine at rest and the work circuit being supplied by the battery alone (as shown in Figs. 1 and 2), an increase in the current demand of the work circuit sufficient to discharge the battery faster than its normal discharge rate will so energize the load coil 13 as to lift its armature to open the lower contacts of the load coil and close its upper contacts, as shown in Fig. 8. The upper contacts of the load coil in closing complete an energizing circuit for closing coil 32 of the automatic switch, which may be traced from the positive pole of battery, coil 32, right hand contacts of relay 26, upper contacts of load coil 13, wire 37 through the dynamo field 16 and primary winding 18 of the ignition coil in parallel, and wire 38 to the negative pole of battery. Since this is the identical circuit which was closed by the engagement of battery indicator contacts 21 and 22 when the battery charge was low, the system passes through the same cycle of operation as was described in that case, namely the dynamo acting as a motor starts the engine (circuits being completed as shown in Fig. 9) and the dynamo is thereafter operated as a generator. The time element device circuit is again completed, so that failure of the motor to start the engine will shut down the power plant and sound the alarm in the same manner as previously described. In case the overload is great enough to slow down the engine, the system will be shut down and the alarm actuated in the manner previously described.

When the demand of the work circuit on the system falls to normal, the load coil permits its armature to fall, opening its upper contacts and closing the lower ones. There is no arcing at the upper contacts, since they are shunted by terminals 28 and 30 of the automatic switch which is closed during operation of the dynamo as a generator. If upon the closure of the lower contacts of the load coil the battery is fully charged, the previously traced energizing circuit for opening coil 33 (illustrated in Fig. 6) is completed through battery indicator contacts 21, 23 and the lower contacts of the load coil, and the consequent opening of the automatic switch shuts down the power plant in the manner previously described. But in case the battery is not fully charged when the work circuit demand becomes normal, the power plant continues to operate until the battery indicator contact 21 engages contact 23 when the battery has become fully charged, whereupon the energizing circuit for opening coil 33 is completed at said contacts, and the power plant is shut down.

I claim:

1. In an electric system in combination a battery, a dynamo electric machine, a prime mover connected thereto, an alarm, means including an automatic switch for completing a circuit connecting the dynamo and battery and a shunt circuit about the alarm, a relay having a set of contacts closed in response to the supply of current from the battery to the dynamo and opened in response to current supply in the reverse direction, a heating element having an energizing circuit completed by the closure of said contacts when said switch is closed, electro-responsive means for opening said switch to disconnect the battery and dynamo and interrupt the shunt circuit about the alarm and a thermostatic element moved in response to heat from said element to operate said electro-responsive means.

2. In an electric system in combination a battery, a dynamo electric machine, a prime mover connected thereto, a circuit including a switch to interconnect the battery and dynamo to start the prime mover, means responsive to a condition of the system for closing said switch, an alarm shunted by the switch when closed, a relay having contacts closed by the flow of current in said circuit from the battery to the dynamo and opened by a reversal of such flow, a heating element connected in series with said alarm and contacts, a coil to open said switch, and a thermostatic member responsive to a predetermined amount of heat from said element to energize said coil, the consequent opening of the switch interrupting the shunt circuit about the alarm to permit the operation thereof and decreasing the current flowing through the heating element sufficiently to retract the thermostatic member to deenergize said coil.

3. In an electric system in combination a battery, a shunt wound dynamo electric machine, a prime mover connected thereto, an armature circuit including terminals of an automatic switch and the battery, a circuit including terminals of said switch and the battery to fully energize the field winding of said dynamo, means including a coil to close said switch terminals to complete said circuits, a set of contacts closed in response to a predetermined discharged condition of the battery, and an operating circuit including the field winding, the coil and the contacts to partially energize the field winding and to energize the coil to close the terminals, the closure of the terminals completing said field and armature circuits and shunting the coil and contacts.

4. In an electric system, in combination a battery, a dynamo electric machine, a prime mover connected thereto, a circuit including terminals of an automatic switch to connect the dynamo and battery, a relay comprising a winding in said circuit and two sets of contacts, the first set closed in response to the supply of current from the dynamo to the battery and the second set closed in response to the supply of current from the battery to the dynamo, a battery indicator having a set of contacts closed in response to a predetermined charged condition of the battery, a circuit including said indicator contacts and electroresponsive means to open said switch terminals to disconnect the battery and dynamo, an energy responsive time element device, a circuit including said second set of relay contacts to actuate said device, and a second operating circuit for said electroresponsive means including a contact closed by said time element device, whereby the battery will be disconnected from the dynamo whenever the battery is charged to a predetermined extent or supplies more than a predetermined quantity of energy to the dynamo.

5. In an electric system, in combination, a battery, a dynamo comprising a shunt field winding and an armature, an internal combustion engine connected thereto, an ignition coil for said engine, a switch having a plurality of terminals, a circuit including certain of said switch terminals to connect said armature to said battery, a circuit including certain of said switch terminals to connect said field winding and ignition coil directly to said battery to fully energize said winding and coil, electro-responsive means arranged when energized to close said switch terminals, and a circuit in parallel with said field and ignition circuit and including said electro-responsive means to energize the latter and to partially energize the field winding and ignition coil, the consequent closure of said switch terminals shunting said electro-responsive means, and fully energizing the field winding and ignition coil to start the engine.

6. In a system of the character described, the combination of a storage battery for normally supplying current to a line, a load coil in series therewith, an indicator switch having a movable member controlled by the condition of the charge in the battery, a dynamo electric machine having a field connected to the movable member of said switch and to said battery, an internal combustion engine for driving said dynamo, a closing coil, an opening coil, an automatic switch having a movable member adapted to be operated by said coils and having three stationary terminals, one of said terminals being connected to the movable element of said switch, a reverse current relay including a winding connected to said battery in series with the armature of said dynamo, one of the terminals of said automatic switch being connected to said winding, a thermostatic device having a heating element connected to the battery and adapted to be placed in circuit by the action of the said reverse current relay, the closing coil being energized by the action of the indicator switch, said thermostatic device being adapted to connect the opening coil in circuit, and a closing device operated by said load coil independently of said battery switch.

7. In an electric system in combination a battery, a dynamo electric machine having an armature, a prime mover connected thereto, a reverse current relay having a winding, a fuse, a resistance shunting said fuse, an automatic switch having terminals to connect said armature, said fuse and resistance, and said relay winding to said battery to operate said dynamo to start said prime mover, a coil to open said switch, and a thermostat device actuated through contacts of said relay to energize said coil, the fuse being arranged to blow in case said armature fails to revolve, the resistance being arranged to permit sufficient current to flow through said winding to operate said relay but not to burn out said armature, whereby the armature circuit will be protected from burning out and the dynamo will be disconnected from the battery upon failure of said dynamo to run as a motor.

8. In a system of the character described, the combination of a storage battery, a dynamo electric machine, a prime mover connected thereto and adapted to drive the same and to be driven thereby, a battery indicator switch having a movable member responsive to changes in the condition of the battery, opening and closing coils, an automatic switch having a movable member operable by said coils, an alarm device and circuit connections including the stationary contacts of said automatic switch for starting said dynamo electric machine as a motor when the condition of the battery falls below a predetermined point and for automatically shunting the contacts of the battery indicator switch and energizing the alarm device in case the prime mover fails to operate within a predetermined period of time.

9. In a system of the character described, the combination of a storage battery, a dynamo electric machine, a prime mover connected thereto and adapted to drive the same and to be driven thereby, a battery indicator switch having a movable member responsive to changes in the condition of the battery, opening and closing coils, an automatic switch having a movable member operable by said coils, an alarm device and circuit connections including the stationary contacts of said automatic switch for starting said dynamo electric machine as a motor when the condition of the battery falls below a predetermined point and for automatically shunting the contacts of the battery indicator switch and energizing the alarm device in case the prime mover fails to operate within a predetermined period of time, and a thermostatic device to control the duration of said period.

10. In an electric system, in combination, a storage battery, a dynamo electric machine having an armature and a shunt field winding, a prime mover operably connected with said dynamo electric machine, a battery switch having a movable contact responsive to the condition of the battery, an automatic switch having two stationary terminals, one of said terminals being connected to the armature and the other to the shunt field winding and said movable member, a closing coil energized in response to movement of said movable member in one direction to close the terminals of said switch to energize said field and armature and shunt said movable member, an opening coil energized in response to movement of said movable member in the opposite direction to de-energize said armature and field and opening coil.

11. In an electric system, in combination, a storage battery, a dynamo electric machine having an armature and a shunt field winding, a prime mover operably connected with said dynamo electric machine, a battery switch having a movable contact responsive to the condition of the battery, an automatic switch having two stationary terminals, one of said terminals being connected to the armature and the other to the shunt field winding and said movable member, a closing coil energized in response to movement of said movable member in one direction to close the terminals of said switch to energize said field and armature and shunt said movable member, an opening coil energized in response to movement of said movable member in the opposite direction to de-energize said armature and field and opening coil, and a thermostatic device adapted to permit the energizing of said opening coil when the prime mover fails to operate.

12. In an electric system, in combination, a storage battery, a dynamo electric machine having an armature and a shunt field winding, a prime mover operably connected with said dynamo electric machine, a battery switch having a movable contact responsive to the condition of the battery, an automatic switch having two stationary terminals, one of said terminals being connected to the armature and the other to the shunt field winding and said movable member, a closing coil energized in response to movement of said movable member in one direction to close the terminals of said switch to energize said field and armature and shunt said movable member, an opening coil energized in response to movement of said movable member in the opposite direction to de-energize said armature and field and opening coil, and a thermostatic device adapted to permit the energizing of said opening coil when the prime mover fails to operate, and means for varying the time element of said thermostatic device.

13. In an electric system, in combination, a storage battery, a dynamo electric machine having an armature and a shunt field winding, a prime mover operably connected with said dynamo electric machine, a battery switch having a movable contact responsive to the condition of the battery, an automatic switch having two stationary terminals, one of said terminals being connected to the armature and the other to the shunt field winding and said movable member, a closing coil energized in response to movement of said movable member in one direction to close the terminals of said switch to energize said field and armature and shunt said movable member, an opening coil energized in response to movement of said movable member in the opposite direction to de-energize said armature and field and opening coil, and adjustable means for automatically energizing said opening coil independently of the action of said movable member.

14. In a system of the character described, a storage battery, a dynamo electric machine, a prime mover associated therewith, a battery charge switch, a reverse current relay having a movable armature, an alarm device, a switch having a movable member operated by the movable member of said relay, a closing coil in circuit with said alarm device, and a thermostatic device in circuit with the alarm device when the movable member of said relay has been moved from its normal position, an opening coil adapted to be energized by the operation of the thermostatic device, and a switch operated by the closing and opening coils to shunt and operate said alarm respectively.

BENJAMIN E. GETCHELL.